Figure 3:
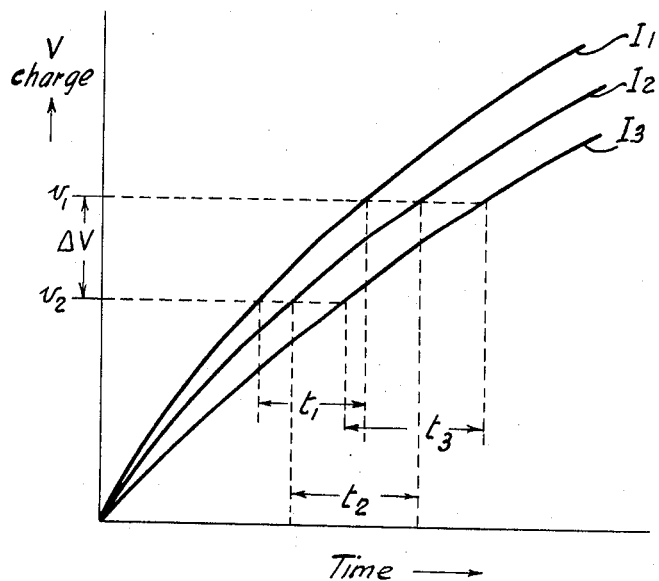

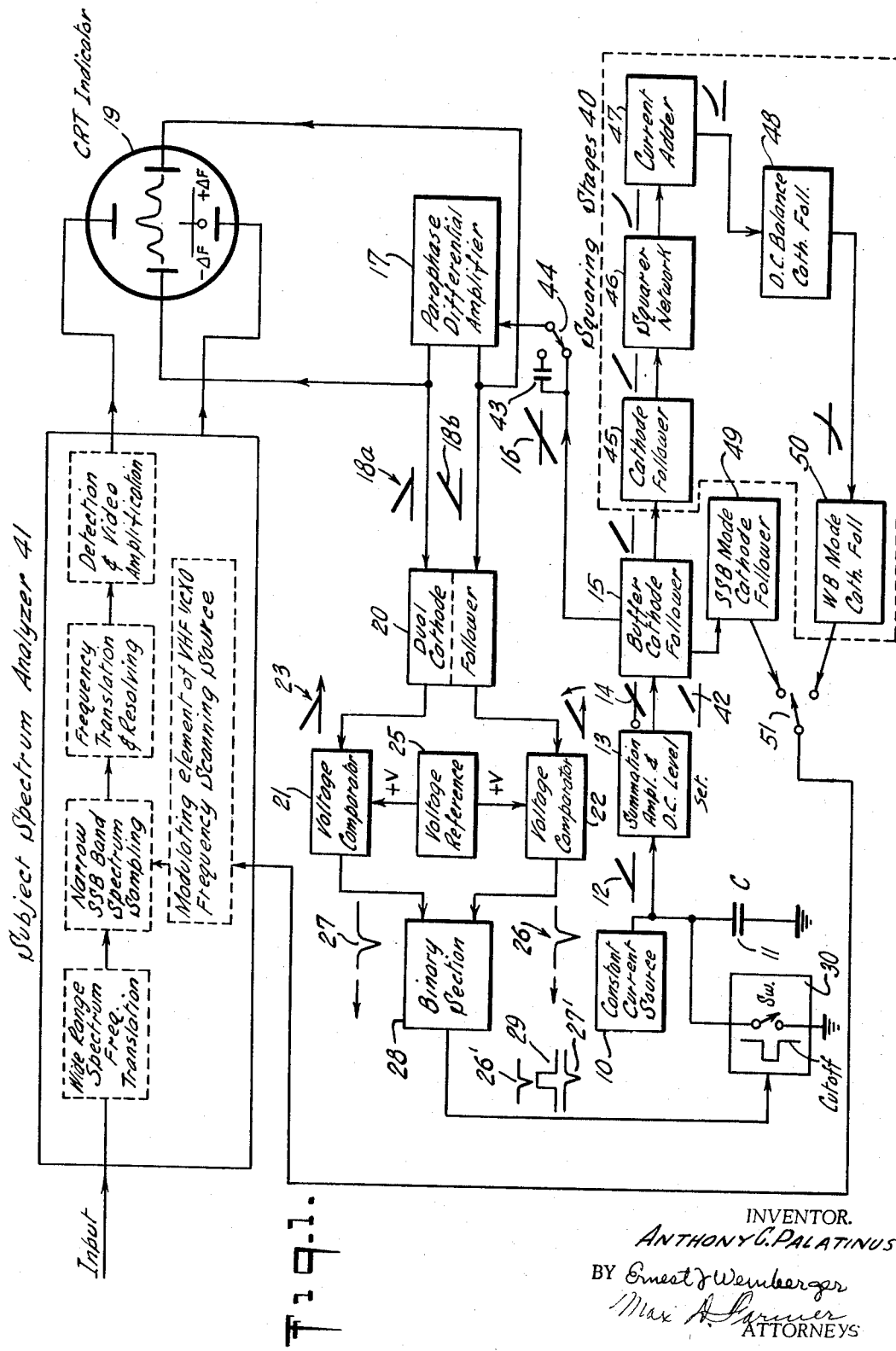

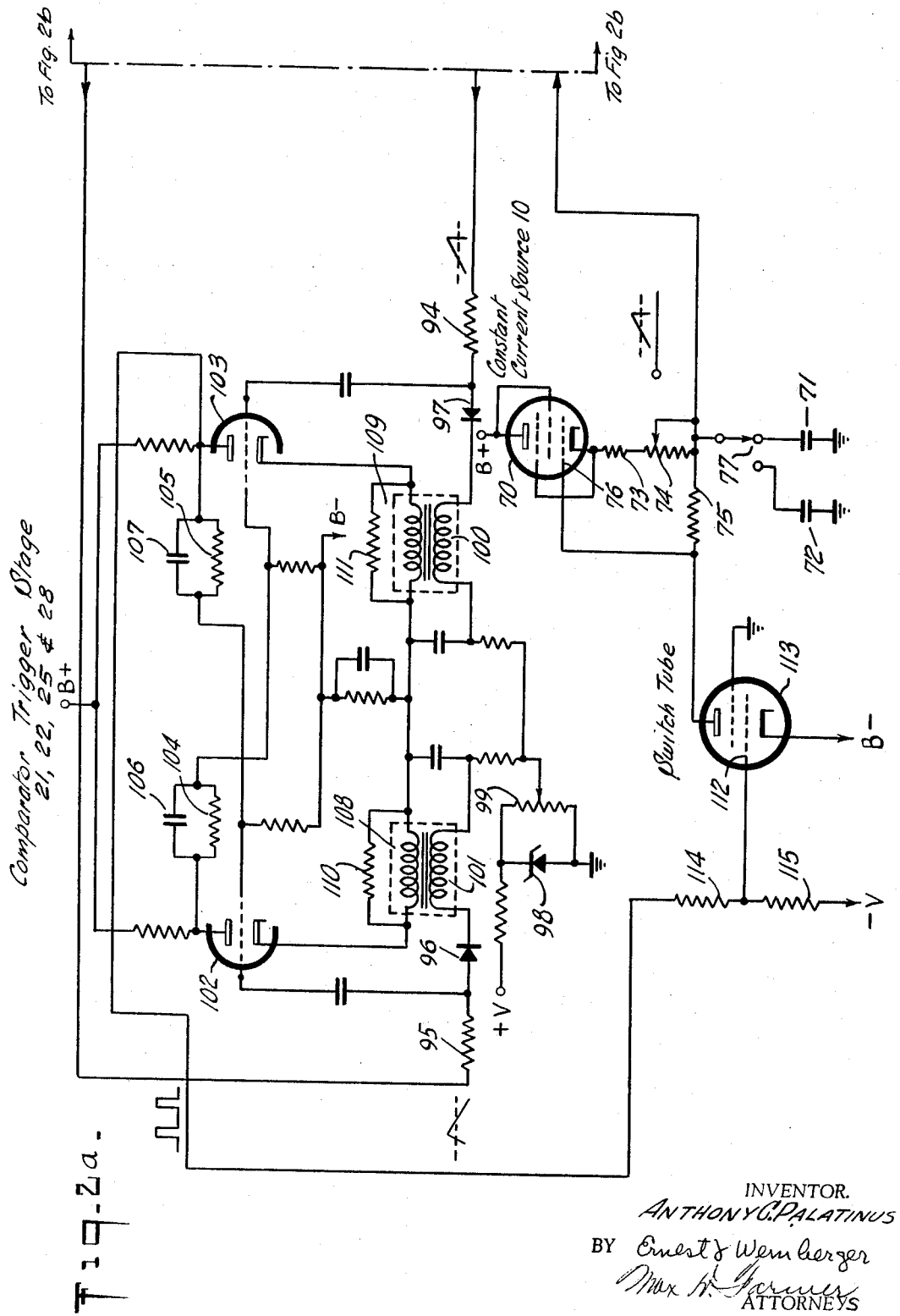

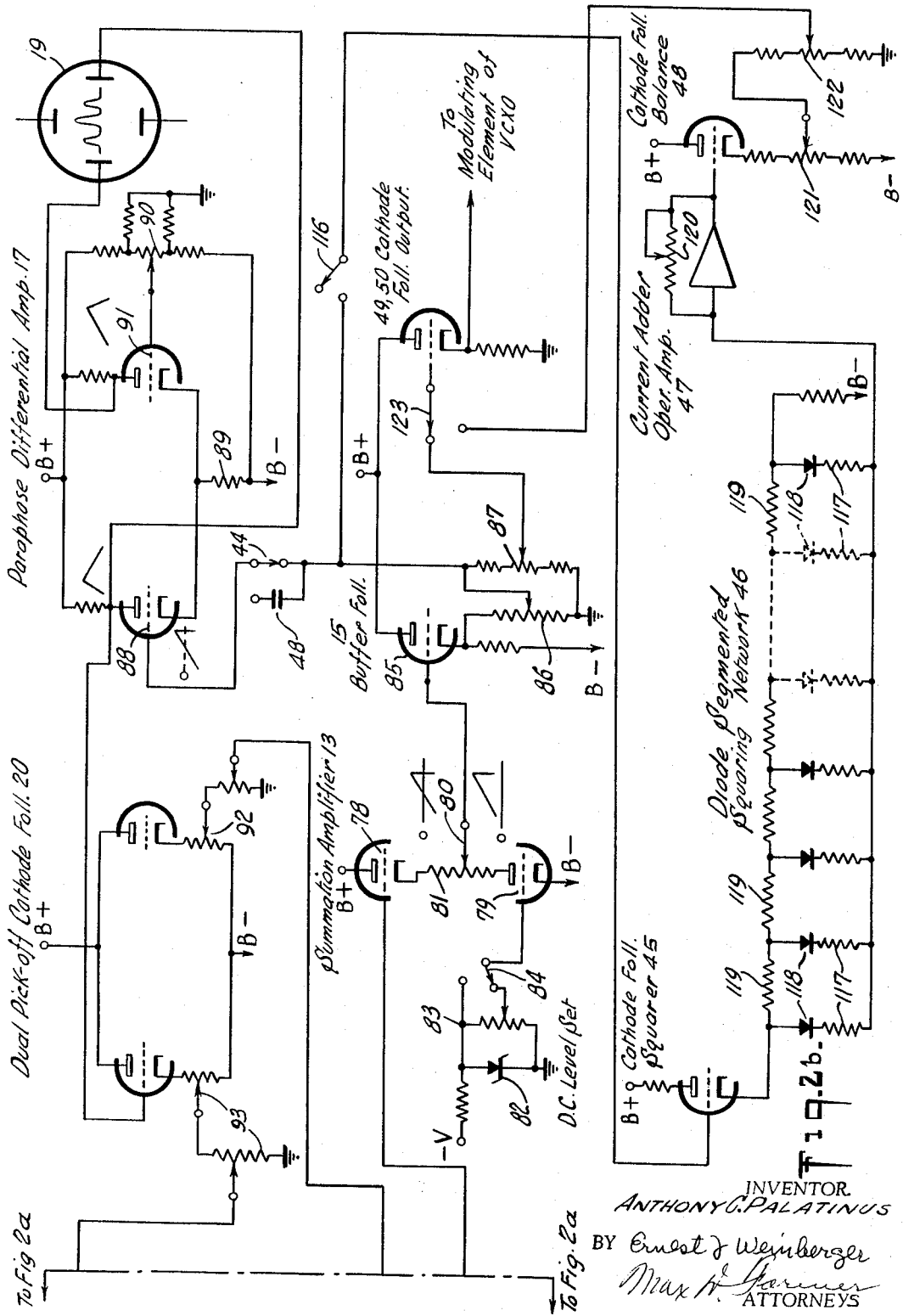

United States Patent Office 3,304,494
Patented Feb. 14, 1967

3,304,494
WIDE RANGE WIDE AND NARROW BAND
DIRECT INDICATING ANALYZER
Anthony C. Palatinus, 68—17 60th Road,
Maspeth, N.Y. 11378
Filed July 16, 1963, Ser. No. 295,565
11 Claims. (Cl. 324—77)

The invention described herein may be manufactured and used by or for the Government of the United States of America for governmental purposes without the payment of any royalties thereon or therefor.

This invention relates to frequency scanning spectrum analyzers and more particularly to the generation of a repeatable, precisely controlled sawtooth voltage for the synchronous linear sweeping in time of both the voltage controlled modulating element of a frequency modulated oscillator and the horizontal deflection of the electron beam of an associated cathode ray tube indicator in a wide range, narrow band-single sideband (NB–SSB) type spectrum analyzer. This sawtooth generator is commonly referred to as a sweep generator in spectrum analyzers and as a time base generator in oscilloscopes.

Most present sweep or time base generators have their sweep voltage excursion initiated and terminated by a voltage operated switch type device which is by itself timed to operate independently of the waveform generating circuits, that is, by an externally timed device controlling the switch or more frequently by being dependent upon the predetermined characteristic of the switch device. Other sawtooth sources not quite so common depend for the start and stop parameters on the actual waveform generation but with only one or the other termination being so controlled in a repeatable manner. Furthermore, usually from such sources a linear voltage variation with time between the excursion limits is always desirable, indeed at times mandatory in spectrum analysis, and present sawtooth generation means to be found either demonstrate, to some practical degree, a high linearity with lack of the necessary repeatability over a range of relatively low repetition rates, or conversely high repeatability with subsequent lack of high linearity being maintained for the useful range of low repetition rates. Likewise, the time interval itself, in between the termination and reinitiation of a sawtooth voltage excursion, generally not of paramount consideration, is at times however, of useful importance in sweep frequency generation; particularly in those applications where the voltage excursion during this interval is effecting return of a frequency excursion in an analyzer system and conventional screen blanking techniques are usually required. Here, where highly selective circuits exist in the signal path, a quite short time interval or rapid recycling is desired to minimize tuned circuit response and it is accordingly desirable to maintain the recycling time constant while the excursion time is variable over a wide range. Another deficiency at times exhibited by prior art devices is that they are not constant gain circuits, in that, by varying the circuit parameters the gain of the generator varies. As for example, amplitude excursions may vary with sweep velocity while it is highly desirable to maintain a uniform constant excursion so that the visual representation on the CRT accurately portrays both the relative amplitude and frequency location of the components that make up the spectrum being analyzed by a direct reading frequency scanning spectrum sampling series sequence type analyzer. Consider the classical signal processing of conventional spectrum analysis, which is rather well known, and usually consists of spectrum frequency translation, spectrum sampling via local oscillator frequency scanning, further frequency translation for wide range narrow band-SSB spectrum examination, spectrum resolving, detection, video or vertical deflection amplification and accordingly a synchronized pattern display of amplitude vs. frequency on a CRT indicator screen. Now in providing for wide range narrow band-SSB spectrum analysis, a multiple heterodyning arrangement is required to be used, wherein the first local oscillator source is a variable frequency oscillator tunable through a wide range of frequencies. It is evidently desirable and at all times advantageous to have the second local oscillator source produce the frequency scanning and spectrum sampling operation with the additional fixed frequency translation being made to occur in the following heterodyning operations until the sideband components of interest are brought into time coincidence with the predetermined resolving IF frequency value for detection and display. In the more specific area of narrow band spectrum analysis, as for example two tone test modulated very high frequency single sideband transmission spectrum output, the frequency swept second local oscillator source, usually having a quiescent or center frequency value of about 180 mcs., must exhibit excellent stability and repeatability of its sweep frequency dispersion. Also, the highly selective resolving of the closely spaced sideband components of the spectrum portion being examined necessitates a range selection of rather slow sweep rates or scanning velocities for the frequency scanning operation. Accordingly, such a scanning second local oscillator source is thereby of crystal controlled stability, with frequency multiplication being used to attain the desired center frequency value for the second heterodyning operation. To uniquely secure such crystal controlled stability without the complexity of crystal discriminator circuitry in an automatic frequency control arrangement or the further heterodyning operation of a low frequency stable scanning source with fixed frequency crystal oscillators, this analyzer system originates in the use of a voltage sensitive, variable frequency crystal oscillator source in the very high frequency region. One such variable frequency crystal controlled oscillator highly desirable is the well known voltage controlled crystal oscillator, at times designated in an abbreviated manner as a VCXO or a VCCO. Here the frequency output of the voltage controlled crystal oscillator deviates in accordance with the amplitude and direction of the instantaneous voltage that exists across its voltage sensitive modulating element. The modulating element of a VCXO is usually a voltage sensitive variable capacitance p–n silicon diode, and in normal operation this modulating element has a separately generated bias voltage, regulated by zener diode, to establish its quiescent or unmodulated operating point, and thus the generation of the quiescent or center frequency value. Thereupon, the application of a stable, balanced about zero, linear sawtooth voltage excursion across this modulating element generates a linear frequency deviation for over a narrow region of the device's variation of voltage to capacitance characteristic curve. The curve of a variable capacitor diode, as is well known, is essentially a square law relationship. Hence, for other than SSB type analysis, such as narrow band found in narrow band FM, where wider ranges of sweep frequency excursion in a linear manner are required, the linear sawtooth voltage must be effectively squared in its waveform shape and thereupon applied across the variable capacitor diode to generate the linear variation of capacitance; and thereby the linear frequency deviation of the analyzer VCXO (or VCCO).

Thus it is evident that present practice deficiencies, for example, in which only one parameter, at best, of the waveform is controlled by the waveshape itself, or other sweep limitations as made known, degrades to an untolerable extent the resolution, stability, and definition capabilities of the overall analyzer. This loss is of prime importance where accurate analysis of a single sideband spectrum is intended via the frequency scanning action of a VHF voltage controlled crystal oscillator source.

It is, therefore, a broad objective of this invention to bring about the accurate generation and control of a voltage controlled crystal oscillator in the spectrum sampling process of an extremely precise and stable wide range spectrum analyzer capable of accomplishing very high frequency, narrow band-SSB spectrum analysis.

It is a further objective of this invention to produce the required sweep voltage means for application to a variable capacitor diode modulating element of a VCXO and accomplish thereby the linear sweep frequency modulation for the proper frequency scanning operation in a wide range narrow band-SSB spectrum analyzer.

It is, therefore, an object of this invention to provide an improved sawtooth generation circuit in which the waveform itself repeatedly controls both the initiation and termination of the sawtooth cycle.

A further object is to provide a sweep generator capable of generating a highly repeatable and precisely controlled waveshape for both linear frequency sweeping of a voltage controlled crystal oscillator and linear horizontal deflection in a spectrum analyzer while having a selectable constant rate characteristic with fixed amplitudes excursions being maintained.

Another object is to provide a simple inexpensive, reliable sweep generator usable over an extended range of scan velocities.

Other objects and advantages will appear from the following description of an example of the invention, and the novel features will be particularly pointed out in the appended claims.

Figure 4:
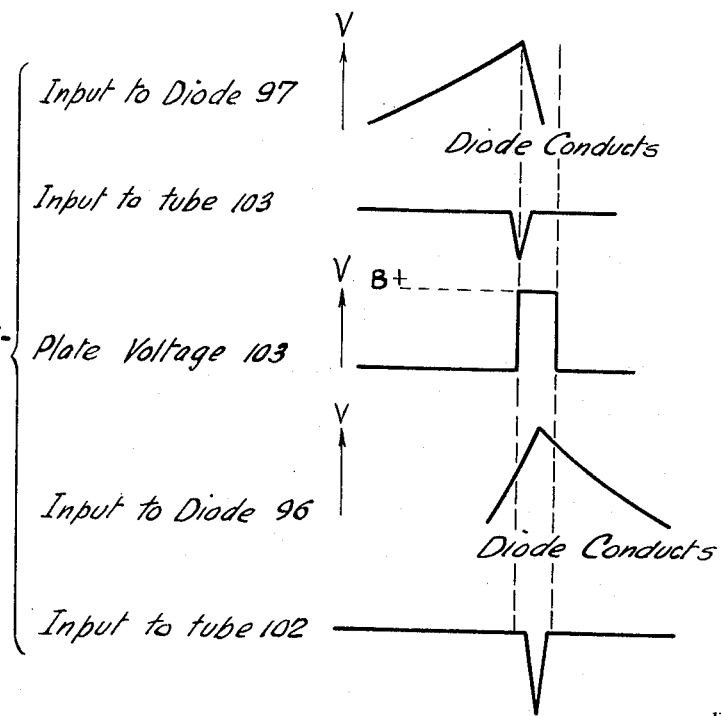

In the accompanying drawings:

FIG. 1 is an overall block diagram of an embodiment of the sweep generation means of this invention and its relation in a wide range spectrum analyzer system having a VHF voltage controlled crystal oscillator as the frequency scanning second local oscillator source, FIG. 2 is a schematic representation of an embodiment of the circuitry of this invention, FIG. 3 is a plot showing the charging network characteristics, and FIG. 4 shows the waveshapes and their relationship within the self-operating loop.

In the illustrated embodiment of the invention as represented in FIG. 1, the overall function concept constitutes a circuit arrangement which may generally be referred to as a self-operating, controlled sweep voltage generation means, producing, once the repetition rate is selected, a precise and constant repetitive waveform with the linear sawtooth waveform being of constant amplitude excursion within a closed loop and likewise being of rapid, fixed flyback time.

In order to more fully comprehend the operation of this invention, the closed loop must be considered actively functioning and at the same time examine stage time when the constant current source 10 develops a selected value constant current which is applied to the charging capacitor 11 and causes this capacitor to charge in a positive sense as shown by the waveshape 12. Now it is generally recognized that a graphical representation of a charging network's characteristic of the total voltage excursion to the maximum voltage being applied across it with time usually exhibits some degree exponential curvature. Likewise, it is equally well understood that supplying the charging capacitor with a constant current, a significant portion of the charging characteristic becomes quite linear. Herein, by repeatedly operating over only a fixed intermediate region of such a charging characteristic, the resultant sawtooth waveform is then maintained always quite linear, in effect the voltage with time variation being a straight line relationship. The charging capacitor 11 itself minimizes leakage and has a stable repeatable charge characteristic by being of high quality mylar type construction. Let this positive going voltage excursion appearing across the capacitor 11 be designated as the trace time of the generated waveform and corresponds to the development of the visual trace across the face of a CRT with the rapid discharge or flyback being referred to as the retrace time and does not visually appear on the CRT screen having a P7 phosphorous coating. The waveform emanating from the charging of the capacitor has a positive D.C. component or reference level in that the actual voltage as measured across the capacitor in one direction is always positive due to the fact that, after the initial charge cycle, the repetitive voltage thereafter starts off at some positive value and proceeds to increase. In order to eliminate this D.C. level, the waveform across capacitor is being applied to a summation amplifier 13 which also includes a D.C. level set. There is generated within this stage a D.C. voltage component of opposite polarity to that of the amplified waveshape; and the summation section linearly adds this to the incoming waveshape so as to provide at its output a like "waveshape" 14 lacking any D.C. component, thus having an equal voltage excursion about the now zero reference voltage. In other words, the output of the summation amplifier is balanced about the zero axis and can then be considered as constituting a D.C. type sawtooth.

This balanced waveshape is applied to the buffer cathode follower 15 which isolates the summation amplifier 13 from the subsequent stages and provides the proper matching impedances therebetween and further provides an output waveshape 16 similar to the input shape thereto. This output is fed into a paraphase amplifier 17, which may be of the common dual stage type, and which produces a pair of plate output signals 18a and 18b similar to the input waveform except that one output is 180 degrees out of phase with the other or put another way, is phase inverted. The balance form of the input to the paraphase amplifier is necessary to produce these two phase inverted outputs of identical form. Generally, this type paraphase amplifier is well known and may be considered as a D.C. amplifier means capable of producing from one input a pair of similar outputs which are phase inverted relative to one another. Hence, the plate outputs of the paraphase amplifier are applied to two separate paths. One path leads to the horizontal deflection plates of the electrostatic CRT indicator 19 to produce the horizontal or X-axis deflection excursion of the CRT beam. This linear beam deflection during the trace time exhibits constant velocity in the lateral displacement of the CRT spot. The other path is the direct and separate application to the respective grid inputs of dual cathode follower 20. This stage 20 serves to establish the proper output impedance level and provides the very high input impedance necessary for maximum isolation and minimal loading of both paraphase amplifier plate outputs, while continuously feeding the picked-off voltage excursions at a proportional low voltage level to the comparator section. The comparator section consists of a pair of comparators 21 and 22, each of which is provided with two inputs and each delivers a separate triggering output in rapid time sequence. The comparators function to produce a single trigger or pulse output at the instant one of the voltage inputs (in our case the waveshape signal 23 or 24) exceeds the other voltage input. These waveshape signals are compared with a precise D.C. voltage reference source 25, and the instant, or the voltage value, of the sawtooth at which this triggering occurs is determined by this reference voltage. These triggers or pulses 26 and 27 take place in a time sequence and as explained hereinafter they serve to initiate and terminate the sawtooth waveform generation. Since the output of the paraphase amplifier is coupled to the horizontal plates of the CRT, then as the sawtooth voltage increases with time, the "spot" on the CRT is made to deflect (trace time) from the left to the right of the screen until the trigger emanating from comparator 22 terminates the sawtooth and thus the trace. With the attendant retrace and an instant later the trigger from comparator reinitiates the trace time. Obviously the value of the reference voltage determines the time duration of the sawtooth and, therefore, the physical length of the trace on the screen has its value selected so that the trace occupies the length between two known points along the horizontal baseline of the CRT, which is calibrated to represent the frequency axis of the analyzer. Subsequent fine adjustments of the reference voltage can be made for compensation purpose as for example, tube ageing and component changes due to environmental conditions.

The trigger outputs of the comparators are fed into binary section 28 which functionally is a flip-flop circuit that can assume either of two stable states. An example of this, may be where one state is a constant voltage output while the other is no output voltage, and the change from one state to the other accomplished by a trigger or pulse input. The rectangular waveshape output 29 of the binary is fed into a voltage sensitive switch 30 which, in this example, remains in the open or cutoff condition as long as there exists a voltage input, but without an input closes or conducts and discharges the capacitor 11 to ground thereby terminating the sweep excursion trace time. This discharge of the capacitor is quite rapid since there is low resistance in the shorting path. In other words, as the voltage across the capacitor 11 builds up and reaches some predetermined value, comparator 22 initiates a trigger which in turn causes the binary 28 to switch from an output to no output thereby allowing the switch 30 to effectively short the capacitor 11 and terminate the sweep build up and CRT trace. As the capacitor discharges, the rapid negative going voltage excursion thereby reflects this change to now permit again, when the D.C. reference voltage is exceeded, the comparator 21 to initiate a trigger that changes the state of the binary and opens the capacitor switch device allowing it to recommence the charging process and again repeat the sawtooth cycle. It is of note that the entire circuitry just described is in the form of a control loop and is self initiated and terminated with respect to the sweep. Also of note is the fact that by providing a selectable constant current (e.g., varying the source 10) the rate of capacitor charge can be controlled between the two set termination limits and thereby the sweep rate can be varied over a range of values and be maintained constant while likewise allowing for an extremely linear sawtooth excursion between these voltage limits or the linear portion of the charging characteristic.

In order to provide wider band sweeping such as required for the larger frequency deviations of a VHF–VCXO, the linear sawtooth hereinbefore described is accordingly squared and this is accomplished by means of the squaring stages 40. The type of squaring device employed herein requires that its input voltage be always positive. Therefore, when wideband sweeps are to be generated for the spectrum analyzer 41, the summation stage 13 has its D.C. level set switched so as to provide a positive bias sufficient to continually maintain a positive sawtooth 42 so that the buffer-cathode follower 15 output is likewise always positive. At the same time, to prevent the appearance of this positive D.C. level at the grid of 17 and thus supply the paraphase amplifier with a balanced input about zero, a D.C. blocking capacitor 43 is interposed between it and the buffer cathode follower 15 by switch 44, which may be ganged to the level set switch. This positive sawtooth upon passing through cathode follower 45 is squared in the squarer stage 46 which, as later illustrated is of the segmented diode type. This combination, in effect, produces a squared current output which is converted by current adder or operational amplifier 47 into a corresponding voltage relation. Since the output of the adder 47 contains a D.C. component (level inserted by amplifier 13) which has been squared, the D.C. balance 48 generates a voltage equal in magnitude and opposite in polarity which bucks out this D.C. level and results in an A.C. or balanced squared sawtooth output. The outputs of the squaring stages and the previously described linear sawtooth are fed into a pair of cathode followers 49 and 50 and, by mode selecting switch 51, are fed to the modulating element of the voltage controlled crystal oscillator of the spectrum analyzer. This oscillator by way of these sweep voltages generates a linear sweep frequency excursion with time about a center frequency value that eventually is visually presented on the CRT 19 as an amplitude display vs. frequency. This sweep frequency in being derived from the sweep voltage is thereby synchronized with the horizontal trace in a one to one relationship so that the display of amplitude response is accurately shown with respect to the frequency component that it represents.

A detailed explanation of the circuit operation is derived by reference to FIG. 2, wherein the constant current source may be a pentode 70 although other well known or conventional constant current sources may be employed. The cathode current from the pentode 70 is applied to the charging capacitor 71, or to the other range capacitor 72 as selected, by way of fixed resistor 73 and rheostat or variable resistance 74. These resistance elements in effect are current feedback resistors with resistor 73 fixing by its particular resistance value the minimum total feedback resistance and, therefore, the maximum possible charging current. Rheostat 74 allows for the fine control of the charging current and as is the case, therefore, variation and setting of the sweep rate of the sawtooth being generated. Grid resistor 75 which lies in the discharge or retrace path serves to improve the characteristic of the flyback time, for as explained herein, as the charging capacitor is being discharged through grid resistor 75, the high discharge current flowing through this resistance 75 develops a large potential across it. This potential, or rather its negative voltage as so applied to the control grid 76, acts to cut the pentode tube off during the discharging of the capacitor. Thus, the constant current does not continue to be supplied during discharge time but only during the charging period, allowing for a more rapid discharge rate to occur.

In order to provide an extensive range of operation for other applications, a number of charging capacitors could be used although only two such capacitors need herein be illustrated. Switch 77 connects either of these to the constant current source. Capacitor 71 serves to provide for the slow range of sweep rates required of quite narrow-SSB spectrum analysis. Capacitor 72 is a lesser value of capacitance, working in conjunction with the same range of selectable constant current values of pentode 70 within the designated voltage limits of the charging characteristics to produce the faster range of sweep rates allowable for wider band spectrum analysis. In general, the slope or curvature of the waveform of the voltage across the capacitor is proportional, at every instant, to the magnitude of the charging current and it is the fact that this current remains constant that improves the slope characteristic (e.g., linearity). Furthermore, this feature permits greater voltage excursions due to the increase in the linear portion of the capacitor characteristic. Clearly, one can always find some limited linear region over which the capacitor may be employed but by the use of the aforementioned pentode circuit this region broadens and becomes ever more linear. By operating the pentode in a region beyond its "knee," its current once adjusted, remains constant for wide variations or fluctuations in voltage across the tube. Here the pentode circuit serves a dual function of sweep rate control via generation of the selected constant charging current and linearity correction of the charging characteristics and the negative cathode current feedback operation.

Once the voltage excursion on the charge characteristic is established the current value is selected and set to provide the period or time required to pass between the lower and upper voltage limits. In other words, this is equivalent to adjusting an R-C network to control the time constant of a circuit, with the pentode circuit functioning as the variable resistance and variations of the sawtooth cycle being attainable as, for example, with voltage limits $v_1$ and $v_2$ and time $t$. FIG. 3 shows three different currents $I_1$, $I_2$, $I_3$ which are applied to the charging capacitor. Between the same voltage limits, it is obvious that the sweep time (or sweep rate) varies from $t_1$ to $t_3$. With the difference voltage $\Delta V$, maintained fixed for a constant voltage excursion, and the resistance value of the discharge path being likewise fixed, a constant flyback time interval is achieved.

In operating over the linear portion of the charging network's characteristic between fixed voltage limits and with constant flyback excursion, the positive D.C. level of the generated waveform across the capacitor becomes fairly well established and is maintained over the wide range of selectable sweep rate variations for a particular capacitor. With ($\Delta VXC$) set as a constant, then a hyperbolic relation exists between $$(\Delta XVC) = K = Ict \text{ loop or } K = yx$$

Now a range of constant current values obtainable from, for example, a 6AU6 pentode characteristic varies from 1 ma. to about 10 ma., and accordingly supplies a selectable range of variable sweep rates from 10 seconds to 1 second. Selection of capacitor 72 for wider band operation covers sweep rates of say 1 second to 0.01 second.

The output across the charging capacitor is applied to one grid 78 of summation amplifier 13 while a selectable D.C. voltage is applied to the other grid 79, whereby the D.C. level of the output may be selected by adjusting the slide contact 80 of potentiometer 81 and the wiper of potentiometer 83. The voltage applied to the second grid 79 is derived from a source employing a Zener diode 82 and a resistance divider network 83 connected thereacross. Switch 84 selects the D.C. voltage valve with the lower contact selected to provide a bias such that at some fixed point along potentiometer 81 the output will be a A.C. sawtooth having the D.C. level eliminated. The potentiometer 81 resistance value is selected so that the D.C. level appearing at the cathode end is balanced by an equal D.C. level at the plate end with a point being developed at the wiper 80 that is at virtual ground or zero level. The upper contact of switch 84 provides for a positive bias output such that the upper and lower voltage limits of the sawtooth excursion will always be positive. The relative output waveshapes are indicated at the output stage for both contact positions.

As explained later in the description of the squaring circuits arrangement, the D.C. level is balanced therein to zero level while capacitive coupling is inserted to prevent the inserted D.C. component from interfering with in the closed loop operation. Hence, the summation amplifier 13 serves a duel function of (1) producing zero D.C. balance for the linear sawtooth output for SSB operation, and (2) act as a signal mixing circuit to produce the required positive D.C. mean potential for the squaring circuit input for wide band operation.

Considering for the moment only the A.C. sawtooth, which is applied to the grid 85 of the buffer-cathode follower 15 which provides the necessary interstage isolation and impedance matching, the signal output is controlled by cathode potentiometers 86 and 87. Potentiometer 86 is adjusted to deliver a predetermined portion of the sweep excursion appearing at the cathode of buffer-cathode follower 15 to the grid 88 input of paraphase amplifier 17 and across potentiometer 87. The fixed potentiometer setting of 86 establishes the maximum limits of the voltage excursion, as for example ± volts being a typical voltage deviation which when accordingly appearing across the modulating element of the VCXO of analyzer 41 produces the maximum linear frequency deviation of say ±5 kc. Thereafter, potentiometer 87 supplies lesser portions of the fixed balanced sawtooth voltage across it to provide for continuously decreasing linear frequency deviation.

In order to eliminate the injected D.C. level from summing amplifier 13 being applied to the input of paraphase amplifier 17, capacitor 43, is interposed in the line by switch 44 when the squaring operation is activated. One grid 88 receives the sawtooth while the other section of the amplifier receives its signal via the cathode resistor 89; and therefore, the plate outputs of the dual stages are in phase opposition or 180 degrees out of phase. Centering potentiometer 90 and its associated resistive circuitry provides a biasing voltage for grid 91 whereby the outputs can be maintained balanced over the same voltage excursion.

The paraphase amplifier exhibits a linear range of operation for the applied grid input sweep voltage of the order of several volts by setting the quiescent grid voltages at ground potential (zero volts) and having the common cathode resistor 89 returned to an appropriately large negative voltage value, B— to bring the voltage level at the common cathode connection near ground potential.

The sweep voltage excursion at the paraphase amplifier input is maintained fixed and is then linearly amplified in the output. The resultant output signals at the tube plates, at any instant, are of opposite polarity and with equal amplitude excursion about a fixed D.C. output level. The total push-pull deflection voltage excursion appearing at the horizontal plates of CRT 19 produces the fixed electrostatic beam deflection width. Centering potentiometer 90 is set for zero balance such that at the instant the input voltage sweep excursion to the paraphase amplifier 17 is at zero volts, the CRT spot is located at the screen center. With the plates being 180 degrees out of phase, the net potential difference, being proportionately changed as the linear sweep, causes the deflection.

In practise, a paraphase amplifier, such as the cathode coupled arrangement of 17, is known to limit the capability of rapid flyback, particularly for high sweep rates, due to the high plate load resistances required to minimize the effects of tube curvature characteristics and to remain within a linear operating region. The range of sweep rates required for the subject spectrum analyzer would not exceed 10 cps. This sweep rate limit is for the wider band operation with capacitor 72 being used in the charging network. The fixed flyback time exhibits its fastest value at this point. The paraphase amplifier outputs are applied to the horizontal deflection plates of CRT 19 and also to the grids of the dual pickoff cathode follower stage 20.

The high input grid impedance of the two cathode follower circuits of this dual stage 20 individually appear in parallel with the plate load resistances of the paraphase amplifier to which they are individually connected. This minimal loading results in the elimination of any reduction in the gain of the push-pull arrangement of the paraphase amplifier, thus allowing the deflection circuitry to be unaffected.

The output of the dual stage is taken across the cathode potentiometers which in turn have dual potentiometers 92 and 93 connected thereacross. The purpose of these dual potentiometers is clear when one realizes that the output voltage level of the paraphase amplifier is quite high and must be proportionately reduced and balanced about a zero reference for application to the next succeeding stage where highly resolved and fast acting comparison is to be achieved. The high resolution is accorded to assure the long term stabilized repeatability of recurrent sawtooth waveform generation and is accomplished by securing the trigger initiating voltage comparison at a low voltage level, wherein highly stable and precise D.C. voltage regulating devices commonly exist such as Zener diode devices.

In practise, cathode follower action reacts more readily to sharp positive-going pulses than negative-going waveforms. Accordingly, the succeeding voltage comparison is thereby set to operate on the positive peak values of the generated waveform appearing at the plate outputs of the paraphase amplifier 20. Dual potentiometers 92 and 93 are fixed and set to function in the following manner. For dual potentiometer 92, the wiper arm of the potentiometer in the cathode to B— path of the cathode follower stage 20 is set to be fixed at a point which is at zero volts D.C. Then any variation in the other potentiometer of the pair only affects the amplitude of the A.C. sawtooth signal and not the zero level and will, therefore, be balanced about zero. Thus, the wiper of the other potentiometer is fixed at a point to have the positive peak amplitude of the sweep voltage excursion output within the control range of the comparative reference voltage. Dual potentiometer 93 operates in a similar manner.

The fast acting comparison itself serves to retain the precision of the generated sweep rate wherein only momentary comparator diode conduction is required to reliably secure, in a positive sense, the desired reversal of the generated waveform. Once this comparison is just slightly exceeded, the subsequent following circuitry in the sweep generation arrangement is immediately actuated in the most rapid and absolute manner by being independent of the waveform itself to open and close the discharge path of the charging capacitor.

The outputs of the dual follower 20 are fed through resistors 94 and 95 to the anodes of comparator diode 96 and 97. The diodes are similar to high speed germanium computer diodes as are presently available on the market. Not only are these diodes fast in switching but also possess an extremely fast recovery time, on the order of a few microseconds. The cathodes of these diodes are positively biased from a precise voltage reference source made up of Zener diode regulator 98 and potentiometer 99 which sets the reference D.C. voltage value. The reference comparison D.C. level appearing at the cathode of the switching diodes is fixed to be slightly less than the predetermined peak positive value of the sawtooth voltage being applied to the diode's anode. Interposed therebetween in each circuit is the secondary (100, 101) of a pulse transformer. It is clear that the instant the input voltage applied to the anode element of the diode exceeds the reference bias voltage at the cathode side, the diode will suddenly conduct, closing the current path through the secondary and generating a negative pulse in the primary of the transformer. The diodes herein are used as series switching elements in a regenerative feedback loop. Regenerative voltage comparators of this type are known as multiars.

The Eccles-Jordan circuit, using a twin triode consisting of tube sections 102 and 103, generates the switching pulse and is in reality a binary stage. One tube assumes either of two stable conditions with the other tube then being in the opposite state, such that they can be made to abruptly change from one state to the other upon the application of a negative pulse of sufficient amplitude to the grid of the "ON" or conducting tube. The plate of each tube is directly coupled to the grid of the other tube by way of resistors 104 and 105, which themselves are shunted by commutating capacitors 106 and 107 respectively, as required to allow for the quick transition time between states. The grids thereupon are connected through separate resistive paths to B—, and also each grid is capacitively coupled to the anode of the comparator diode that causes it to cut off.

The cathodes of these tubes are common to a cathode resistor-by-pass capacitor circuit to B— after being connected to each other through primaries 108 and 109 of the pulse transformers, each primary being shunted and critically damped by resistors 110 and 111 respectively, such that only single pulse oscillation is experienced in the cathode circuit. The plate load resistors are connected to B+. Generally, the overall stage circuitry comprises three parts: a source of D.C. reference voltage, a pair of multiars operating in the fashion of blocking oscillators, and a bistable flip-flop or binary circuit.

Let us assume for the sake of explanation that tube 103 is conducting and, therefore, the voltage at its plate is at its lowest level and the input to diode 97 is a positively increasing sawtooth voltage. When the sawtooth voltage reaches a positive value slightly exceeding the reference voltage, the diode suddenly conducts and a sharp and substantial negative pulse is generated by the pulse transformers quickly cutting off tube 103 and causing tube 102 to conduct. When tube 103 ceases to conduct, its plate voltage rises to approximately B+ and remains at that level until the tube is made to conduct again. The plate of tube 103 is connected to the grid 112 of tetrode switching tube 113 through resistor 114. The grid is negative biased through resistor 115 and is normally cut off or open circuited except when the plate voltage of tube 103 approaches B+. The combination of resistors 114 and 115 set the quiescent level for good cutoff of the tetrode. When B+ is applied, the tetrode conducts and shorts out the charging capacitor 71 causing it to discharge and fly back. The rapidly decreasing capacitor voltage appears as a positively increasing voltage at the plate output of paraphase amplifier 17 which feeds its signal output to the anode of diode 96 through its cathode follower section. Since the input at diode 96 is in phase opposition to that at diode 97, the voltage quickly rises to fire the diode and, through the negative trigger pulse generated at primary 108, thereby cuts off tube 102 and allows tube 103 to conduct again. This cyclic action results in a narrow rectangular pulse type output at the plate of tube 103. These relationships are clearly illustrated in FIG. 4 and it is this narrow positive pulse that causes the charging capacitor to be discharged by way of switch tube 112, or any similar device such as any of the multitude of solid states switch now available all of which may be termed voltage sensitive switches. It is of note that this entire circuit is in a closed loop and, therefore, affords the previously mentioned advantages.

Since the output of the paraphase amplifier was applied to the horizontal deflection circuits of the CRT and this CRT sweep is synchronized with the sawtooth output at the buffer-cathode follower 15, it is merely necessary to sweep the frequency of the VCXO of the analyzer and thereby present a visual representation. It is, however, desirable to provide more than one mode of sweep, as for example, narrow and wide band. By utilizing the above mentioned output and feeding it to cathode followers 49, 50, the narrow band mode is attainable by direct application at the modulating element. For wide band application, one requires a squared sawtooth input voltage at the modulating element which in our case is a voltage sensitive capacitor. Since the squaring means contemplated herein requires a continually positive input, then for the wide band mode, switch 84 is positioned to apply the maximum voltage from diode 82 of the D.C. level set thereby providing an output at the summation amplifier 13 which is always positive. The output of the buffer-amplifier 15 appearing at the wiper of potentiometer 86 is applied to the cathode follower squarer 45 through switch 116; and thence to the squaring network 46 which comprises a number of series combinations of resistors 117 and diodes 118 shunted by resistors 119. The greater the number of such segments the greater the squaring accuracy of the network. This network operates only for a positive input and the applied sawtooth is maintained fixed and above ground for its entire excursion. Since the output of this form of squarer is essentially a current, it is converted by the feedback operational amplifier or current adder 47 into a like voltage. Potentiometer 120 in the feedback loop sets the scale factor for the loop while the voltage output of this stage is fed into D.C. balance 48, which is in the form of a cathode follower such as one section of dual cathode follower 20. The cathode output is taken across potentiometer 121 and the output squared sawtooth is balanced about ground by the setting of this potentiometer 122 in this circuit controls the wideband sweep width. This squared balanced sawtooth is now applied through switch 123 to the grid of cathode follower (49, 50) as were the narrowband modes. The output of the follower is applied to the modulating element of the spectrum analyzer 41 in order to frequency sweep or modulate the analyzer VCXO in synchronism with the linear CRT trace.

The squaring operation is set to result in amplification of the fixed linear sweep excursion applied, besides producing the waveform shaping. The waveshape accordingly develops a linear variation of the voltage sensitive capacitor diode modulating element of the VCXO for the larger voltage excursion being applied. The resulting larger linear capacitance deviation of the VCXO generates a greater amount of frequency deviation as required for wider band operation of this subject analyzer in accordance with the objectives of the invention.

It will be understood that various changes in the details, materials and arrangements of parts (and steps) which have been herein described and illustrated in order to explain the nature of the invention, may be made by those skilled in the art within the principle and scope of the invention as expressed in the appended claims.

What is claimed is:

1. A circuit for the generation of repetitive, constant amplitude sawtooth voltages having precisely controlled voltage excursion limits which comprises:
    (a) a source of constant current,
    (b) a capacitor connected across said source for receiving a charging current therefrom,
    (c) a paraphase differential amplifier having one input and a pair of outputs, said paraphase amplifier input connected across said capacitor,
    (d) a source of a selectable stable reference voltage,
    (e) a pair of comparators each having two inputs and one output and operable to produce a pulse only when the voltage level applied to one of said inputs exceeds the voltage level applied to the other of said inputs,
    (f) electrical means connecting one output of said paraphase amplifier to each one input of one of said comparators,
    (g) said source of said reference voltage applied to the other input of each of said comparators,
    (h) a bistable switching device having input and output terminals capable of assuming either of two states, said states being open and grounded output terminals, said device switching from one state to the other state upon the application of a pulse to said input terminals,
    (i) wiring means connecting said outputs of said comparators to said inputs of said bistable means,
    (j) additional wiring means connecting said capacitor across said output terminals of said bistable device whereby the charging of said capacitor may be accurately controlled as well as the voltage limits between which said capacitor is charged and the voltage across said capacitor will be a repetitive sawtooth voltage.

2. The circuit according to claim 1, wherein said source of constant current is selectable and continuously variable.

3. The circuit according to claim 2, wherein said bistable means includes a bistable multivibrator and an electronic switch activated by said multivibrator.

4. The circuit according to claim 2, further including means connected across said capacitor for squaring in magnitude the voltage appearing thereacross.

5. In a wide range spectrum analyzer having connected therein an oscilloscope and a voltage controlled crystal oscillator having input terminals for application of a voltage to control its frequency of oscillation; that improvement for the generation of a sawtooth voltage which comprises:
    (a) a current source having a selectable constant current output,
    (b) a capacitor connected to receive said output of said current source and to be charged thereby,
    (c) amplifier means having one input and a pair of outputs, the signal at one output being 180 degrees out of phase with the other output,
    (d) said input of said amplifier means electrically connected to receive the voltage developed across said capacitor,
    (e) a source of selectable reference voltage,
    (f) a pair of comparator circuit means having two input terminals and one output terminal, each of said circuit means connected for individually receiving one of the outputs of said amplifier means and said reference voltage and for producing at its output terminal a pulse when said reference voltage exceeds the voltage output signal from said amplifier means,
    (g) switch means having an input terminal and connected across said capacitor for alternately assuming one of two states, grounding and open circuiting said capacitor, and operable to change from one state to the other when a pulse is applied to its input terminal,
    (h) said output terminals of said comparators connected to the input terminal of said switch means whereby the voltage developed across said capacitor will be a linear sawtooth, and may be connected to said oscillator input terminal for creating a linear frequency shift and concurrently having the output of the amplifier means connected to the horizontal deflection circuit of said oscilloscope so as to sweep in synchronization with said frequency shift.

6. The improvement according to claim 5, further including a variable resistance connected between said capacitor and said current source.

7. The improvement according to claim 6, further including a summing amplifier connected between said capacitor and said amplifier means.

8. The improvement according to claim 7, wherein said amplifier means is a paraphase differential amplifier.

9. The improvement according to claim 8, wherein said comparator means are multiar circuits.

10. The improvement according to claim 9, wherein said switching means is a multivibrator and a switching tube activated thereby.

11. The improvement according to claim 10, further including an amplitude squaring network disposed between said capacitor and said oscillator input terminals for providing a wide frequency sweep.

References Cited by the Examiner

UNITED STATES PATENTS

| 2,378,604 | 6/1945 | Wallace. | |
| 2,552,884 | 5/1951 | Cannon | 315—29 |
| 2,704,325 | 3/1955 | Taylor | 325—337 |
| 2,706,777 | 4/1955 | Lutz | 325—336 |
| 3,005,928 | 10/1961 | Wuster | 315—26 |
| 3,217,271 | 11/1965 | Autorino et al. | 328—183 X |

WALTER L. CARLSON, *Primary Examiner.*

P. F. WILLE, *Assistant Examiner.*